United States Patent
Chan et al.

(10) Patent No.: US 7,512,973 B1
(45) Date of Patent: Mar. 31, 2009

(54) WIRELESS-ACCESS-PROVIDER INTERMEDIATION TO FACILLIATE DIGITAL RIGHTS MANAGEMENT FOR THIRD PARTY HOSTED CONTENT

(75) Inventors: Wone-Hoe Chan, Overland Park, KS (US); Shabbir Mukadam, Overland Park, KS (US); Pujan Roka, Olathe, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 962 days.

(21) Appl. No.: 10/936,391

(22) Filed: Sep. 8, 2004

(51) Int. Cl.
*H04L 9/32* (2006.01)

(52) U.S. Cl. .................. 726/10; 726/8; 726/9; 726/20; 713/185; 705/56; 380/272

(58) Field of Classification Search ................ 726/8, 726/9, 10, 20; 380/269, 272; 705/56; 713/185
See application file for complete search history.

(56) References Cited

U.S. PATENT DOCUMENTS

| | | |
|---|---|---|
| 5,077,790 A | 12/1991 | D'Amico et al. |
| 5,708,780 A | 1/1998 | Levergood et al. |
| 5,764,188 A | 6/1998 | Ghosh et al. |
| 5,908,469 A | 6/1999 | Botz et al. |
| 5,930,777 A | 7/1999 | Barber |
| 5,933,498 A | 8/1999 | Schneck et al. |
| 5,961,593 A | 10/1999 | Gabber et al. |
| 6,029,141 A | 2/2000 | Bezos et al. |
| 6,035,281 A | 3/2000 | Crosskey et al. |
| 6,037,935 A | 3/2000 | Bates et al. |
| 6,052,730 A | 4/2000 | Felciano et al. |
| 6,092,196 A | 7/2000 | Reiche |
| 6,101,510 A | 8/2000 | Stone et al. |
| 6,112,242 A | 8/2000 | Jois et al. |
| 6,121,970 A | 9/2000 | Guedalia |
| 6,134,680 A | 10/2000 | Yeomans |

(Continued)

FOREIGN PATENT DOCUMENTS

WO    WO 9843177    10/1998

(Continued)

OTHER PUBLICATIONS

U.S. Appl. No. 10/128,828, filed Apr. 24, 2002 entitled "Method and System for Gateway-Based Authentication".

(Continued)

*Primary Examiner*—Matthew B Smithers
*Assistant Examiner*—Paul Callahan (57) ABSTRACT

A method and system for wireless access provider management of digital rights. A wireless carrier receives a content request transmitted from a given wireless client station. The carrier determines by reference to digital rights management data that the requested content is premium content and then determines if the requesting party has the right to obtain the content. If the party does not have the right to obtain the content, the wireless carrier may engage in a payment collection process, to collect the party's payment for the content. Upon determination that the requesting party has the right to obtain the content, the wireless carrier inserts an access-token into the content request and sends the content request, with the access-token, to the content provider. The content provider can then rely on the access-token as proof that the requesting party has the right to obtain the requested content.

20 Claims, 3 Drawing Sheets

U.S. PATENT DOCUMENTS

| | | | |
|---|---|---|---|
| 6,161,185 | A | 12/2000 | Guthrie et al. |
| 6,178,511 | B1 | 1/2001 | Cohen et al. |
| 6,195,545 | B1 | 2/2001 | Baker et al. |
| 6,199,077 | B1 | 3/2001 | Inala et al. |
| 6,199,079 | B1 | 3/2001 | Gupta et al. |
| 6,202,087 | B1 | 3/2001 | Gadish |
| 6,233,608 | B1 * | 5/2001 | Laursen et al. .............. 709/217 |
| 6,247,048 | B1 | 6/2001 | Greer et al. |
| 6,253,193 | B1 | 6/2001 | Ginter et al. |
| 6,266,681 | B1 | 7/2001 | Guthrie |
| 6,269,460 | B1 | 7/2001 | Snover |
| 6,311,215 | B1 | 10/2001 | Bakshi et al. |
| 6,317,718 | B1 | 11/2001 | Fano |
| 6,321,256 | B1 | 11/2001 | Himmel et al. |
| 6,407,680 | B1 | 6/2002 | Lai et al. |
| 6,421,733 | B1 | 7/2002 | Tso et al. |
| 6,434,614 | B1 | 8/2002 | Blumenau |
| 6,457,030 | B1 | 9/2002 | Adams et al. |
| 6,510,458 | B1 | 1/2003 | Berstis et al. |
| 6,510,464 | B1 | 1/2003 | Grantges et al. |
| 6,519,631 | B1 | 2/2003 | Rosenschein et al. |
| 6,535,896 | B2 | 3/2003 | Britton et al. |
| 6,560,607 | B1 | 5/2003 | Lassesen |
| 6,582,474 | B2 | 6/2003 | LaMarca et al. |
| 6,590,588 | B2 | 7/2003 | Lincke et al. |
| 6,594,697 | B1 | 7/2003 | Praitis et al. |
| 6,643,641 | B1 | 11/2003 | Snyder |
| 6,684,249 | B1 | 1/2004 | Frerichs et al. |
| 6,687,732 | B1 | 2/2004 | Bector et al. |
| 6,694,484 | B1 | 2/2004 | Mueller |
| 6,704,773 | B1 | 3/2004 | Cohn et al. |
| 6,721,780 | B1 | 4/2004 | Kasriel et al. |
| 6,826,597 | B1 | 11/2004 | Lonnroth et al. |
| 6,832,239 | B1 | 12/2004 | Kraft et al. |
| 6,874,018 | B2 | 3/2005 | Wu |
| 6,880,123 | B1 | 4/2005 | Landsman et al. |
| 6,892,181 | B1 | 5/2005 | Megiddo et al. |
| 6,910,068 | B2 | 6/2005 | Zintel et al. |
| 6,912,571 | B1 | 6/2005 | Serena |
| 6,918,090 | B2 | 7/2005 | Hesmer et al. |
| 6,925,485 | B1 | 8/2005 | Wang et al. |
| 6,957,334 | B1 * | 10/2005 | Goldstein et al. ........... 713/170 |
| 6,987,987 | B1 | 1/2006 | Vacanti et al. |
| 7,080,158 | B1 | 7/2006 | Squire |
| 7,107,309 | B1 | 9/2006 | Geddes et al. |
| 7,210,094 | B2 | 4/2007 | Dovin et al. |
| 2001/0035885 | A1 | 11/2001 | Iron et al. |
| 2002/0007393 | A1 | 1/2002 | Hamel |
| 2002/0047859 | A1 | 4/2002 | Szlam et al. |
| 2002/0052968 | A1 * | 5/2002 | Bonefas et al. .............. 709/231 |
| 2002/0059396 | A1 | 5/2002 | Holzer et al. |
| 2002/0099738 | A1 | 7/2002 | Grant |
| 2002/0120564 | A1 | 8/2002 | Strietzel |
| 2002/0129064 | A1 | 9/2002 | Guthrie |
| 2002/0165925 | A1 | 11/2002 | Hamilton, II et al. |
| 2003/0018668 | A1 | 1/2003 | Britton et al. |
| 2003/0023634 | A1 | 1/2003 | Justice et al. |
| 2003/0032413 | A1 | 2/2003 | Aksu et al. |
| 2003/0055878 | A1 | 3/2003 | Fletcher et al. |
| 2003/0058271 | A1 | 3/2003 | Van Der Meulen |
| 2003/0110296 | A1 | 6/2003 | Kirsch et al. |
| 2003/0177248 | A1 | 9/2003 | Brown et al. |
| 2003/0187806 | A1 | 10/2003 | Banerjee et al. |
| 2004/0059783 | A1 | 3/2004 | Kazui et al. |
| 2005/0055422 | A1 | 3/2005 | Campbell et al. |
| 2005/0066012 | A1 | 3/2005 | Campbell et al. |
| 2005/0086298 | A1 | 4/2005 | Campbell et al. |
| 2005/0138432 | A1 | 6/2005 | Ransom et al. |
| 2005/0144557 | A1 | 6/2005 | Li et al. |

FOREIGN PATENT DOCUMENTS

| | | |
|---|---|---|
| WO | WO 03065678 | 8/2003 |

OTHER PUBLICATIONS

ZDNet: Tech Update: Enterprise Application/Single sign-on battle looms, http://techupdate.zdnet.com/techupdate/stories/main/0,14179,2824248,00.html, printed from the World Wide Web on Feb. 19, 2002.

Introduction to Single Sign-On, http:www.opengroup.org/security/sso/sso_intro.htm, printed from the World Wide Web on Feb. 19, 2002.

Novell: Novell SecureLogin, http://www.novel.com/source/printer_friendly/ql20017_en.html, printed from the World Wide Web on Feb. 19, 2002.

Network Appliance, "Internet Content Adaption Protocol (ICAP)," pp. 1-13, Jul. 30, 2001.

IBM, "Intermediaries: An Approach to manipulating Information Streams", http://www.research.ibm.com/journal/sj/384/barrett.html, IBM Systems Journal, vol. 38, No. 4, 1999.

First USENIX Workshop on Electronic Commerce, Jul. 1995, Payment Switches for Open Networks, http://www.usenix.org/publications/library/proceedings/ec95/gifford.html, printed from the World Wide Web on Apr. 15, 2002.

USENIX, "Payment Switches for Open Networks," Proceedings of the First USENIX Workshop on Electronic Commerce, New York, New York, Jul. 1995, http://www.usenix.org/publications/library/proceedings/ec95/full_papers/gifford.txt, printed from the World Wide Web on Apr. 15, 2002.

Redknee, "Mobile Multimedia Gateway," http://www.redkneww.com/products/rk_pro_net_mobilemultimediagateway.php, printed from the World Wide Web on Apr. 15, 2002.

"Open Pluggable Edge Services (OPES)," http://www.ietf-opes.org/oldindex.html, printed from the World Wide Web on Apr. 15, 2002.

IBM, "Web Intermediaries (WBI)," http://www.almaden.ibm.com/cs/wbi/index.html, printed from the World Wide Web on Apr. 30, 2002.

IBM, "Plugins," http://www.almaden.ibm.com/cs/wbi/Plugins.html, printed from the World Wide Web on Apr. 30, 2002.

IBM, "WebPlaces: Adding People to the Web," http://www.almaden.ibm.com/cs/wbi/papers/www8/wwwplaces-abstract.html, printed from the World Wide Web on Apr. 30, 2002.

IBM, "WebSphere Edge Server—Product Overview—IBM Software," http://www-3.ibm.com/software/webservers/edgeserver/, printed from the World Wide Web on Sep. 3, 2002.

Bridgewater Systems, "Content Access Controller," http://www.bridgewatersystems.com/products/content_controller/?BSCID=d8f8772, printed from the World Wide Web on Sep. 3, 2002.

A. Barbir et al., "An Architecture for Open Pluggable Edge Services (OPES)," Network Working Group, Internet-Draft, Aug. 2, 2002.

A. Barbir et al., "OPES Use Cases and Deployment Scenarios," Network Working Group, Internet-Draft, Aug. 5, 2002.

A. Beck et al., "Requirements for OPES Callout Protocols," Internet-Draft, Aug. 2, 2002.

A. Beck et al., "Example Services for Network Edge Proxies," Internet Draft, Nov. 21, 2000.

IBM, Location-based services, http://www-106.ibm.com/developerworks/ibm/library/l-lbs/, printed from the World Wide Web on May 23, 2003.

Identifying Web Users in a Proxy Server, U.S. Appl. No. 09/466,104 (Applicants do not have a copy of the cited patent application).

Extracting Contents of a Document During Delivery, U.S. Appl. No. 09/512,974 (Applicants do not have a copy of the cited patent application).

Secure Network Proxying, U.S. Appl. No. 09/512.975 (Applicants do not have a copy of the cited patent application).

Expediting the Retrieval of External Components Referenced in a Document, U.S. Appl. No. 09/512,976 (Applicants do not have a copy of the cited patent application).

Commerical Activity Performed in Conjunction with Document Retrieval, U.S. Appl. No. 09/512,977 (Applicants do not have a copy of the cited patent application).

Modifying Contents of a Document During Delivery, U.S. Appl. No. 09/513,217 (Applicants do not have a copy of the cited patent application).

Fielding et al. "Request for Comments (RFC) 2616: Hypertext Transfer Protocol—HTTP/1.1", published by Network Working Group, Jun. 1999.

Pollock, "A Custom 404 Page", www.pagesource.com/zine/custom404.htm, Apr. 18, 1999.

4GuysFrom Rolla.com, "Creating a Custom 404 Error Page", publicly posted Apr. 21, 1999.

The Apache Foundation, "Custom Error Responses", Apache HTTP Server Version 1.3, documentation released Dec. 5, 2001.

American Express Company 2001, http://www.26.americanexpress.com/privatepayments/fag.jsp, printed from the World Wide Web on Oct. 17, 2002.

Thomason, Larisa, "Load Time Tip: Reuse, Optimize, and preload Images" http://www.netmechanic.com/news/vol_13/loadtime_no6.htm, vol. 3, No. 6, Jun. 2000.

Wang et al., "Department of Computer Science, University College London, London WC1E 6BT, United Kingdom".

Tong et al., Alleviating the Latency and Bandwidth Problems in WWW Browsing, http://www.usenix.org/publications/library/proceedings/usits97/full_papers/tong/tong_html, Oct. 26, 1997.

Padmanabhan et al., "Using Predictive Prefetching to Improve World Wide Web Latency".

Jacobson et al., "Potential and Limits of Web Prefetching Between Low-Bandwidth Clients and Proxies".

Jiang et al., "Web Prefetching in a Mobile Environment" IEEE Personal Communications, pp. 25-34, Oct. 1998.

Davison, "Predicting Web Actions from HTML Content" Jun. 15, 2002.

Duchamp, "Prefetching Hyperlinks" Usenix, Boulder, Colorado, Oct. 11-14, 1999.

Bestavros, Azer, "Speculative Data Dissemination and Service to Reduce Server Load, Network Traffic and Service Time in Distributed Information Systems" Mar. 1996.

Wcol, "WWW Collector Home Page", http://shika.aist-nara.ac.jp/products/wcol/wcolE.html, printed from the World Wide Web on Jul. 1, 2003.

Chinen, et al., "An Interactive Prefetching Proxy Server for Improvement of WWW Latency", http://www.isoc.org/inet97/proceedings/A1/A1_3htm, Jul. 3, 2003.

The List Preload Images, http://www.lists.evolt.org/archive/Week-of-mon-20020204/067827.html.

Burns, "So, You Want to Pre-Load, Hugh?", http://www.htmlgoodies.com/tutors/preload.html, printed from the World Wide Web on Nov. 14, 2002.

Google Groups, "Lewis, Stephen, Newsgroup Message, dated Jul. 24, 2000", http://groups-beta.google.com/group/microsoft.public.webdesign.html.

Introduction to SSL, http://developer.netscape.com/docs/manuals/security/sslin/contents.htm, Oct. 9, 1998.

Gerck, E., Ph.D., "Overview of Certification Systems: X.509, PKIX, CA, PGP & SKIP" Jul. 18, 2000.

Gerck, E., "Overview of Certification Systems: X.509, CA, PGP and SKIP" http://mcg.org.br/cert.htm, Apr. 17, 1997.

X.509, http://www.hsc.fr/resources/presentations/pki/img9.htm, 1999.

Trusted Computing Platform Alliance (TCPA), "Building a Foundation of Trust in the PC" Jan. 2000.

Carroll, Amy; Juarez, Mario; Polk, Julia and Leininger, Tony, "Microsoft "Palladium": A Business Overview", http://www.microsoft.com/presspass/features/2002/jul02/0724palladiumwp.asp, Jan. 25, 2003.

Anderson, Ross., "TCPA / Palladium Frequently Asked Questions", Version 1.0. http://www.cl.cam.ac.uk/~rja14/tcpa-faq.html, Jan. 16, 2003.

Internet Explorer SSL Vulnerability, http://www.thoughtcrime.org/ie-ssl-chain.txt, Aug. 5, 2002.

Lemay, Teach Yourself Web Publishing with HTML 3.0 in a Week, published by Sams.net, p. 65, 1996.

U.S. Appl. No. 10/189,941, filed Jul. 3, 2002.
U.S. Appl. No. 10/189,937, filed Jul. 3, 2002.
U.S. Appl. No. 10/189,892, filed Jul. 3, 2002.
U.S. Appl. No. 10/190,362, filed Jul. 3, 2002.
U.S. Appl. No. 10/189,720, filed Jul. 3, 2002.

* cited by examiner

WIRELESS-ACCESS-PROVIDER INTERMEDIATION TO FACILLIATE DIGITAL RIGHTS MANAGEMENT FOR THIRD PARTY HOSTED CONTENT

FIELD OF THE INVENTION

The present invention relates to network communications and, more particularly, to digital rights management in such communications.

BACKGROUND

Generally speaking, it is known for a wireless carrier to provide an access channel through which wireless client stations (such as cell phones, wirelessly-equipped PDAs, and other wireless equipped devices) can access content from servers on the public Internet. In a typical arrangement, for instance, the wireless carrier may provide a radio access network (RAN) that interfaces between the wireless client stations and the carrier's core packet-switched network. In turn, the carrier's core network may then be connected through a firewall with the public Internet. With this arrangement, a wireless client station can send a request for web content (e.g., an HTTP request), via the RAN and the carrier's core network, to a content server on the Internet, and the content server can respond by providing the requested content to the client station.

While much of the content on the Internet is freely available upon request, other content is considered "premium" and is available only for a fee. Typically, when a user sends a request for premium content to a content server, the content server will responsively prompt the user to pay for the requested content and, upon receipt of payment from the user, will then send the requested content to the user. Alternatively, upon receipt of the premium content request, the content server may refer to a "digital rights management" (DRM) database to determine whether the user has already acquired the right to access the content (e.g., paid for the content) and, upon thereby determining that the user has already acquired the right to access the content, may send the requested content to the user.

SUMMARY

The present invention provides an improved mechanism for controlling access to content. The invention leverages the fact that a wireless carrier provides a trusted access channel through which all of its wireless subscribers communicate, and so all content requests from those wireless subscribers will pass through the wireless carrier's system on the way to third party content providers.

According to the invention, a wireless carrier will provide an intermediation system that will intercept content requests being sent from wireless client stations to third party content servers. Upon receipt of such a content request, the intermediation system will read the request and thereby determine that the request seeks premium content (or, more generally, limited-access content). The intermediation system will then responsively determine whether the requesting user/client already owns the right to access the requested content and, if not, will work with the user/client to convey the right to access the requested content (e.g., by collecting payment, or agreement to pay, from the user/client).

Upon confirmation that the requesting user/client has the right to access the requested content, the intermediation system will then insert into the content request a special access-token indicative of that right and will forward the content request, including the access-token, along to the content provider. The content provider may then conveniently rely on that access-token as proof that the requesting user/client has the right to access the requested content, rather than having to engage in a digital rights management process itself.

These as well as other aspects, advantages, and variations will become apparent to those skilled in the art by reading the following detailed description with reference to the accompanying drawings.

DETAILED DESCRIPTION OF AN EXEMPLARY EMBODIMENT

As noted above, according to the invention, a wireless carrier will provide an intermediation system that will intercept content requests being sent from wireless client stations to third party content servers and that will verify access rights and insert access-tokens in the content requests so that content providers will know that requesting users/clients have the right to obtain requested content. The figures generally illustrate this arrangement and process. It should be understood, however, that these and other arrangements and processes shown and described herein are provided as examples only, and that many variations are possible. For instance, elements can be combined, distributed, omitted, added, or re-ordered. Further, the various logic functions described herein can be carried out by any combination of hardware, firmware and/or software, such as by one or more suitably programmed processors, for instance.

Figure 1:
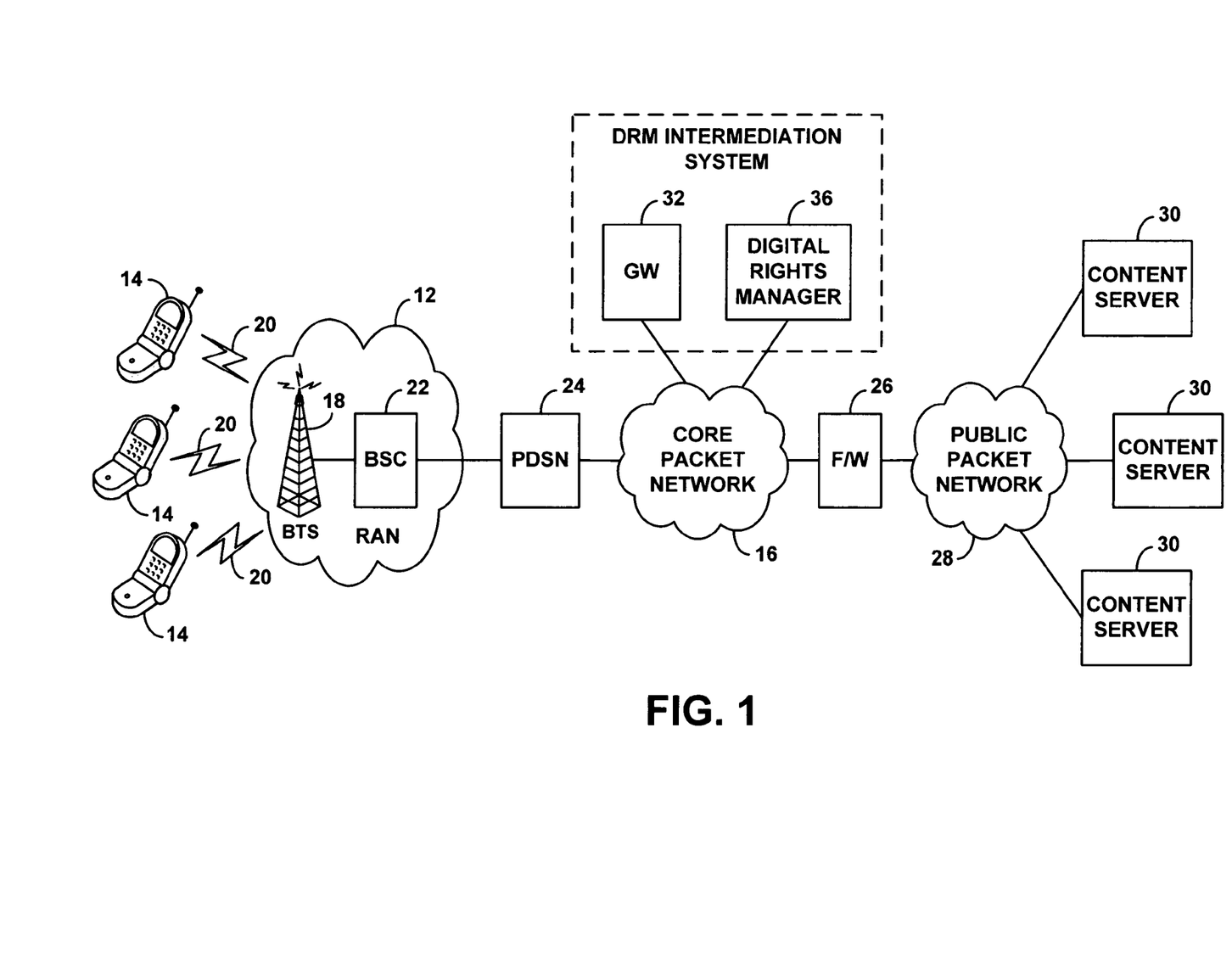
FIG. 1 is a simplified block diagram of a communication system arranged to implement an exemplary embodiment of the invention.

FIG. 1 first illustrates an example communication system in which the invention can be implemented. As shown, the communication system includes a wireless carrier's radio access network (RAN) 12 that interfaces between wireless client stations 14 (e.g., cell phones, wirelessly-equipped personal digital assistants, wirelessly-equipped personal computers, etc.) and a wireless carrier's core packet network 16. The RAN 12 includes, by way of example, a base transceiver station (BTS) 18 that communicates over an air interface 20 with the client stations 14 and over a standard interface with a base station controller (BSC) (or radio network controller (RNC)) 22. The BSC 22 is then coupled with a packet data serving node (PDSN) 24 or other network access server that provides connectivity with the core packet network 16. And the core packet network 16 is connected through a firewall 26 with a public packet network 28, such as the Internet, on which content servers 30 reside. Alternatively, some or all of the content servers 30 could reside on the carrier's core packet network 16 or elsewhere.

In a typical arrangement, the wireless carrier will further provide a gateway 32 on its core packet network 16 and will pass some or all data communications from wireless client stations 14 through the gateway 32. To force data communications through the gateway, the carrier may program each wireless client station to use the gateway 32 as a proxy server. Alternatively, or additionally, another access channel element, such as PDSN 24, may be arranged to tunnel or redirect all data communications from the wireless client stations 14 to the gateway 32. The gateway may carry out various beneficial functions, such as authorizing data communications, converting user/client IDs from one form to another, reporting presence information, and transposing web content to a form suitable for delivery to and rendering by wireless client stations 14. As a specific example, the gateway may be a WAP gateway.

With this arrangement, some or all content requests that are sent from wireless client stations 14 to content servers 30 will pass through an access channel comprising the wireless carrier's RAN 12 and core packet network 16. More particularly, the content requests would pass over air interface 20 to RAN 12, through PDSN 24 to core packet network 16, and then through gateway 32 and perhaps public packet network 28, to content servers 30.

In accordance with an exemplary embodiment of the invention, the wireless carrier will provide or host an intermediation system within the access channel, in order to manage digital rights for content requests that are being transmitted from client stations 14 to content servers 28. The intermediation system, or at least a trigger to the intermediation system, will be positioned in the access channel in such a manner that content requests will be forced to pass to it. One way to accomplish this is to incorporate at least a portion of the intermediation system within an element of the access channel through which content requests would normally pass in any event.

By way of example, as shown in FIG. 1, the intermediation system could be integrated with gateway 32 on the carrier's core network 16. More particularly, as shown by dashed box 34 in FIG. 1, the intermediation system could include the gateway 32 and a digital rights manager 36. In this arrangement, the gateway 32 could function as an intermediation trigger point, so that whenever the gateway receives a content request from client stations 14, the gateway sends the content request (e.g., wrapped in an HTTP request) to digital rights manager 36 for processing. When digital rights manager 36 finishes processing the content request, digital rights manager 36 may then pass the content request back to gateway 32 (e.g., wrapped in an HTTP response), and gateway 32 may send the content request along to the destination content server. (Alternatively, the digital rights manager 36 may effect transmission of the content request to the content server in some other manner.) Because data communications from client stations 14 already pass through the gateway 32 in the normal course, the intermediation system in this arrangement could easily be made to act upon the content requests that pass through the gateway.

Alternatively, the intermediation system could be incorporated elsewhere in the conventional access channel, such as at BTS 18, BSC 22, PDSN 24, or some other node (e.g., a mobile-IP home agent) for instance, or entirely in gateway 32. Still alternatively, the intermediation system could be provided as an additional element on core network 16, and content requests could be made to pass through the intermediation system just as content requests would normally pass through gateway 32. For instance, the intermediation system could provided as a node on core network 16, and client stations 14 could be set to use the intermediation system as a proxy server, or PDSN 24 or gateway 32 could be set to tunnel or redirect content requests to the intermediation system. Other arrangements and positioning of the intermediation system are possible as well.

Figure 2:
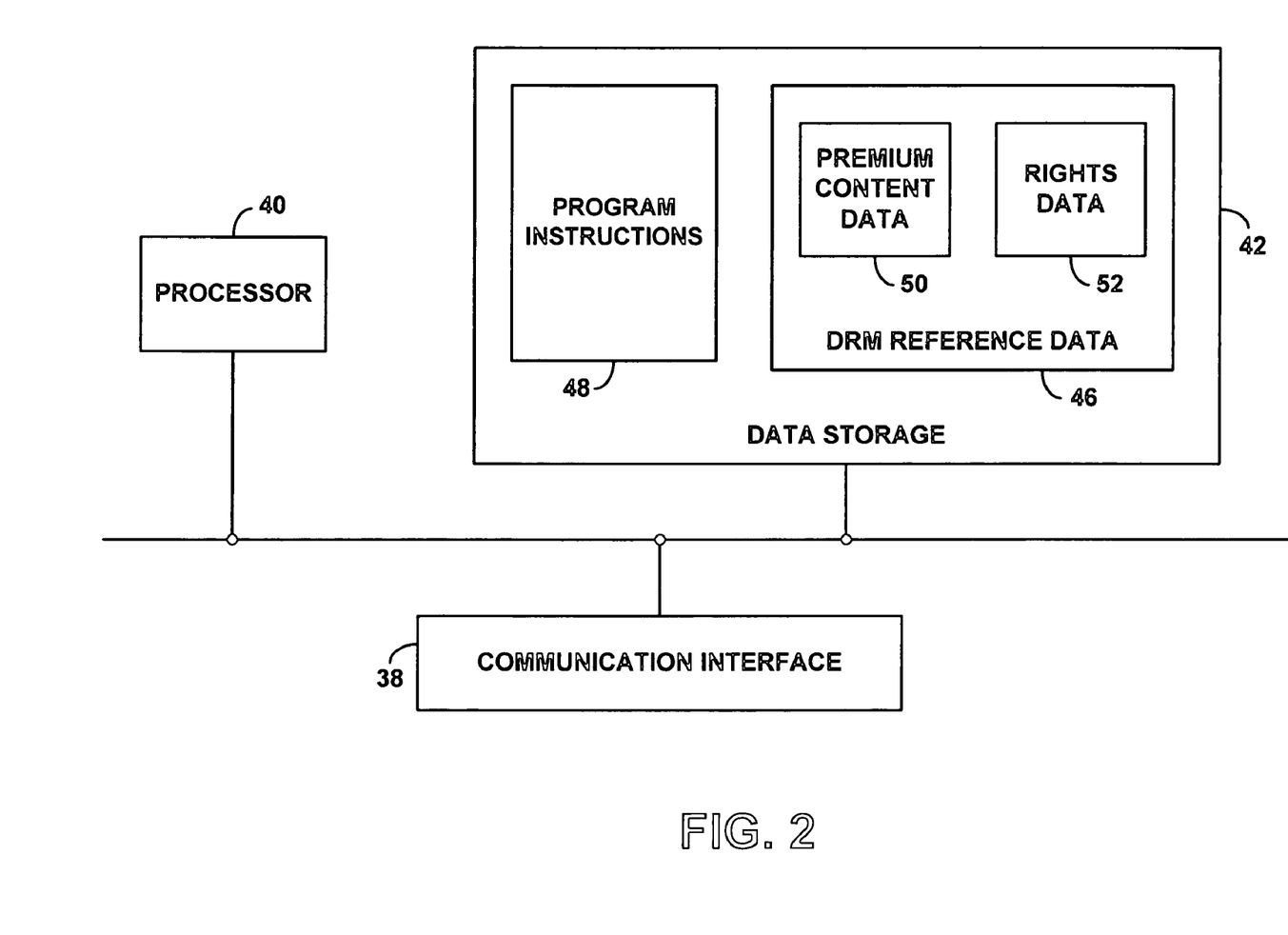
FIG. 2 is a block diagram of an intermediation system arranged to carry out digital rights management in accordance with the exemplary embodiment.

FIG. 2 is a simplified block diagram depicting functional components of an example intermediation system. As shown in FIG. 2, the intermediation system includes a communication interface 38, a processor 40, and data storage 42, which are coupled together by a system bus, network and/or other mechanism 44. If the intermediation system is incorporated as part of one or more other network elements, such as gateway 32 for instance, these functional components could be components of those other network elements, adapted (e.g., programmed) to carry out the inventive functions described herein. Alternatively, the functional components could be provided specifically for the purpose of carrying out the invention.

Communication interface 38 provides connectivity for receiving and sending content requests and, as such, can take various forms. For instance, if the intermediation system is positioned in-line within the access channel, the communication interface 38 may include a client-side port through which the intermediation system receives content requests sent from the client stations and a server-side port through which the intermediation system sends content requests along to content servers. Or if the intermediation system is positioned as a node on core network 16, the communication interface 38 may be a network interface module (e.g., an Ethernet network interface card) through which the intermediation system can both receive and send content requests. Other arrangements are possible as well.

Processor 40 comprises one or more processors, such as one or more general purpose processors (e.g., Intel® microprocessors) and/or special purpose processors (e.g., digital signal processors). Data storage 42, in turn, comprises one or more volatile and/or non-volatile storage segments, which can be integrated in whole or in part with processor 40. Data storage 42 holds DRM reference data 46 and program instructions 48 executable by processor 40 to carry out various functions described herein.

DRM reference data 46 comprises data that the intermediation system will use as a basis to determine the extent to which users/clients have the right to acquire certain content. As such, DRM reference data 46 could include (i) premium content data 50 and (ii) rights data 52, which could be integrated together or maintained separately, in any of a variety of forms.

Premium content data 50 indicates what content is considered "premium" content, i.e., what content a user/client would need to have the right to acquire, as opposed to content that is freely available to everyone without regard to whether they have the right to acquire it. As such, premium content data 50 could specify premium content by listing what content is considered premium. The list of premium content could take the form of a database table, in which records specify particular content (e.g., URLs) or categories of content (e.g., domain names or other URL groupings, or other classifications of content). Alternatively, premium content data 50 could specify what content is premium by listing what content is not premium. Any content that is not contained on the list would thus be considered premium content. The premium content data 48 could take other forms as well.

Rights data 52, in turn, indicates whether particular users/clients own (have) the right to access particular premium content, such as whether users/clients have already paid for (or agreed to pay or to be billed for) particular content or have otherwise obtained the right to access the content. As such, rights data 52 could take various forms. By way of example, rights data 52 could comprise a set of user/client profile records, each keyed to a particular user or client ID, and each then specifying which premium content the user/client owns the right to access. (The user/client profile records could be user/client profile records maintained for other purposes, adapted to be used for digital rights management in accordance with the invention. Alternatively, the user/client profile records could be created especially to facilitate digital rights management.)

In one arrangement, for instance, each user/client profile record could define a DRM rights level, such as "gold", "silver" or "bronze", and premium content data 50 could characterize each instance of premium content as being available for access by users/clients having at least a particular DRM rights-level. In another arrangement, each user/client profile record could specify particular instances (individual instances or categories) of premium content that the user/client owns the right to access. For instance, each user/client profile record could list specific URLs or domain names that the user/client owns the right to access, possibly in a relational database format, with reference to records of the premium content data 48.

Note that the DRM data can be keyed to users and/or client stations. User profiles might apply regardless of which client station a user is operating, and may be keyed to a user-ID. Client profiles might apply regardless of which user is operating the client station, and may be keyed to a client station ID, such as mobile identification number, electronic serial number, or device-specific NAI, for instance. In some instances, a particular user may be the rightful owner and operator of a particular client station, so a profile keyed to the client station may be functionally equivalent to a profile keyed to the user.

DRM reference data 46 can be initially provisioned by an administrator (person or computer system) through a local computer connection, through an online web interface, or in some other manner. By way of example, the wireless carrier can make arrangements with various content providers to perform DRM intermediation service for content providers, and the wireless carrier can structure premium content data 50 to specify the applicable premium content. Further, the wireless carrier can work with its subscribers to convey DRM rights (e.g., rights to access specific content or groups of content), such as at the time of initial subscription to service, and can designate the subscribers' rights in right data 52.

Over time, the DRM reference data 46 will then change, as users/clients acquire DRM rights (or lose DRM rights) and as the set of premium content (specific instances or categories) changes. When such changes occur, the DRM reference data 46 can be automatically updated to reflect the changes. For instance, when a user pays for particular content through the intermediation system, the intermediation system can automatically update the DRM reference data 46 to indicate that the user and/or the user's client station owns the right to obtain that content. Or when a user pays for particular content through some other entity, such as an e-commerce website hosted by the wireless carrier or the content provider for instance, the other entity could then signal to the intermediation system to cause the intermediation system to update the DRM data 46. Similarly, when content providers create new content or change the status of their content from premium to standard or vice versa, the content providers could signal to the intermediation system to cause the intermediation system to update the DRM reference data 46. Alternatively, if some other entity (other than the intermediation system) manages the DRM reference data 46, that other entity could make changes to the data when necessary.

Continuing with reference to FIG. 2, as noted above, data storage 42 holds program instructions executable by processor 40 to carry out various functions described herein. In the exemplary embodiment, those functions include receiving content requests, using DRM reference data 46 to determine whether requesting parties (users and/or clients) have DRM rights to requested content, facilitating conveyance (e.g., sale) of DRM rights to requesting parties, generating and inserting DRM access-tokens within content requests, and sending content requests along to content servers. These functions are illustrated generally by the flow chart of FIG. 3.

Figure 3:
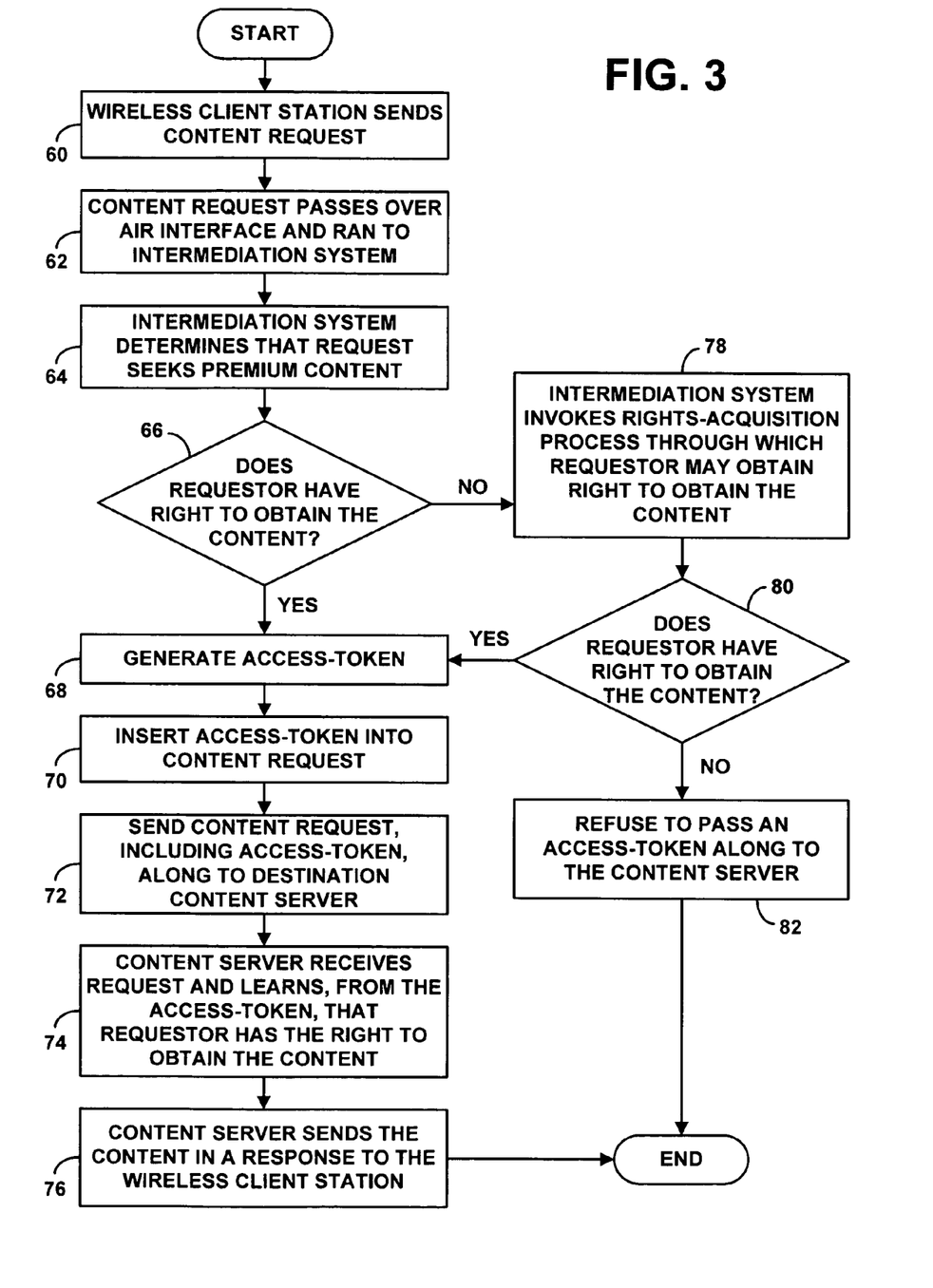
FIG. 3 is a flow chart depicting an example set of functions that can be carried out in the arrangement of FIG. 1.

As shown in FIG. 3, at step 60, a wireless client station 14 begins by wirelessly transmitting a content request, such as an HTTP request, FTP request or other sort of content request, to the network address (e.g., URL or IP address) of a content server 30. At step 62, the content request passes over air interface 20 and through RAN 12 to core packet network 16 and in turn to the intermediation system. As noted, the content request can be made to pass to the intermediation system by setting the wireless client station 14 to use the intermediation system, or some portion thereof (e.g., gateway 32), as a proxy server.

At step 64, the intermediation system evaluates the content request in view of premium content data 50 and thereby determines that the content request seeks premium content. At step 66, the intermediation system thus next refers to rights data 52 to determine whether the requesting party (the client station and/or user thereof) has the right to obtain the requested content.

If the intermediation system determines that the requesting party has the right to obtain the requested content, then, at step 68, the intermediation system generates an access-token indicative of the right, and, at step 70, the intermediation system inserts the access-token into the content request. At step 72, the intermediation system then sends the content request, including the access-token, along to the destination content server. At step 74, the content server receives the request, and, based on the access-token, learns that the requesting party has the right to obtain the requested content. Thus, at step 76, the content server sends the requested content in a response to the wireless client station.

On the other hand, if the intermediation system determines that the requesting party does not have the right to obtain the requested content, then, at step 78, the intermediation system may invoke a rights-acquisition process through which the requesting party can acquire the right to obtain the requested content. For example, the intermediation system may invoke a "charge-advice" process in which the requesting party would receive and respond to a request to pay or agree to pay (or be billed) for the content and thereby acquires the right to obtain the content. Once the requesting party acquires the right to obtain the content, the intermediation system may then update DRM data 46 to indicate that the party has the right to obtain the content.

At step 80, the intermediation system can then again determine (inherently or expressly) whether the requesting party now has the right to obtain the requested content. If the intermediation system determines that the requesting party has the right to obtain the requested content, then the process continues at step 68, where the intermediation system would generate an access-token and send the content request, including the access-token, along to the content server. On the other hand, if the intermediation system determines that the requesting party still does not have the right to obtain the requested content, then, at step 82 the intermediation system may refuse to pass an access-token along to the content server. In that case, the intermediation system can pass the content request along without the access-token, leaving the content provider to decide whether to provide the requested content, or the intermediation system can block the content request, possibly sending an error message in a response to the requesting party or taking some other action.

In a preferred embodiment, each content request received by the intermediation system will identify the requested content in a manner that allows the intermediation system to determine from premium content data 50 whether the content is premium. By way of example, a typical content request will identify the requested content by a URL or other network address that points to the content. Upon receipt of such a content request, the intermediation system may thus read the URL from the request and then query premium content data 50 to determine if the URL represents premium content. Other content identifiers can be used as well.

In addition, each content request received by the intermediation system will preferably have (e.g., carry or be associated with) an identifier indicative of the requesting party, so as to allow the intermediation system to determine from the rights data 52 whether the requesting party owns the right to access the requested content. In many instances, the identifier will be a user-ID (e.g., username, NAI, SIP address, etc.) indicative of a user of the client station that sent the content request. In other instances, the identifier may be a device-ID (e.g., ESN, NAI, MSID, etc.) indicative of the client station that sent the request. The identifier may be carried in a header parameter of the content request. For instance, in an HTTP request, the identifier may be carried in a username field or other header field. Upon receipt of the content request and determination that the requested content is premium, the intermediation system may then look up the identifier in the rights data 52 to determine if the requesting party owns the right to access the requested content.

As noted above, if the intermediation system determines that the requesting party owns the right to obtain the requested content, the intermediation system then generates and inserts an access-token in the content request. This process can be carried out by one or more components of the intermediation system. By way of example, gateway 32 may determine that the requesting party has the right to obtain the content and may responsively generate or obtain an access-token and insert the access-token into the content request and forward it to the content provider. Alternatively, gateway 32 may first determine that the content request seeks premium content and may responsively pass the content request along to digital rights manager 36. Digital rights manager may then confirm that the requesting party has the right to access the content and may responsively generate or obtain an access-token and insert the access-token into the content request and forward it to the content provider. Still alternatively, digital rights manager 36 may confirm that the requesting party has the right to obtain the content and may signal back to the gateway, and the gateway may responsively insert an access-token in the content request before passing the content request along to the content provider. Other examples are possible as well.

As a general matter, the access-token will indicate that the requesting party has the right to obtain the requested content (e.g., that the party has paid for, or agreed to pay for or be billed for the content). In a preferred embodiment, to avoid having the requesting party itself provide the access-token in its request (thereby spoofing the content server into thinking that the intermediation system verified DRM rights already), the intermediation system will encrypt the access-token in a manner that will enable the destination content provider to decrypt the access-token and to verify its authenticity. By way of the example, the intermediation system may generate each token by encrypting a functional combination (e.g., concatenation or sum) of a unique content ID (e.g., the URL requested), a unique carrier ID (e.g., a predefined identifier of the wireless carrier), and a unique customer ID (e.g., an identifier of the requesting party), possibly together with a timestamp and/or other information.

Various encryption algorithms can be used for this purpose, the particular details of which are not critical. As a general example, using well known PGP encryption, the intermediation system could encrypt the access-token, or some portion thereof, with a randomly generated session key, encrypt the session key using the destination content provider's public key, and then send the encrypted session key and encrypted access-token to the content provider. The content provider could then use its secret key to decrypt the encrypted session key and then use the decrypted session key to decrypt the access-token.

Ideally, the wireless carrier and content provider will arrange for this encryption in advance, so that the content provider will be able to decrypt, and thereby uncover, the access-token. For instance, the content provider may provide the wireless carrier with the content provider's public key for PGP encryption, and the wireless carrier may program the intermediation system to use that public key to encrypt the access-token. Thus, when the content server receives a content request containing an encrypted access-token, the content server may automatically decrypt the encrypted access-token and verify that the carrier has already confirmed the requesting party's right to obtain the content.

The intermediation system can insert the access-token (in encrypted or plaintext form) into the content request in various ways, the details of which are also not critical. By way of example, the intermediation system can insert the access-token into a predefined header parameter of the content request. For instance, if the content request is an HTTP request, the intermediation system could insert the access-token into a predefined header parameter of the HTTP request. Preferably, the intermediation system will insert the access-token in a manner that the content server will expect, so that the content server can readily read the access-token from the content request.

As further noted above, if the intermediation system determines that the requesting party does not have the right to obtain the requested content, the intermediation system may invoke a rights-acquisition process, such as a charge-advice process, through which the requesting party can acquire the right to obtain the requested content. The rights-acquisition process can be carried out by the intermediation system itself or by some other entity or entities, such as a remote server for instance. If the rights-acquisition process is carried out by the intermediation system itself, then invoking the process may be simply calling and executing an applicable program module. If the rights-acquisition process is carried out by another entity, then invoking the process may involve signaling out to the other entity and getting a response back from the entity once the rights-acquisition process is complete.

By way of example, if the intermediation system receives an HTTP request seeking particular web content, processor 40 may programmatically store the HTTP request in data storage 42 and execute a charge-advice process. In that process, processor 40 may send an HTTP response to the client station, prompting a user to provide credit card payment or to indicate an agreement to pay or to be billed for the requested content. When the user responds to the payment prompt, a new HTTP request would pass to the intermediation system. Assuming that the user has paid or agreed to pay or to be billed (or has otherwise successfully acquired the right to obtain the requested content), processor 40 may then update DRM reference data 46 to indicate that the user and/or client has the right to obtain the content. Processor 40 may then generate and insert into the original HTTP request an access-token and send the content request, including the access-token, along to the content provider.

In accordance with the exemplary embodiment, the wireless carrier, through its intermediation system, may thus collect a user's payment or agreement to pay for content that is supplied to the user by a third party content provider. Ideally, by including within the access-token an identifier of the wireless carrier that collected payment, the intermediation system can enable the content server to log which wireless carrier collected payment for the content and to then recover that payment from the wireless carrier. To facilitate this, the intermediation system could include in the access-token an indication of whether the wireless carrier charged for the content or whether the wireless carrier merely confirmed that the requesting party had already paid for the content. That way, the content provider could determine for each instance whether to collect payment from the carrier.

An exemplary embodiment of the present invention has been described above. Those skilled in the art will understand, however, that changes and modifications may be made to this embodiment without departing from the true scope and spirit of the present invention, which is defined by the claims.

For example, while the foregoing describes an example access channel over which a wireless client station sends content requests, the access channel and means for communication over the access channel can take other forms. For instance, a user could employ the wireless client station to call a voice command platform (e.g., a VXML based platform or other IVR-based platform) and can then convey a content request through interaction with the voice command platform. In that instance, the access channel would include the voice command platform. Further, in that case, the intermediation system could be positioned in whole or in part at the voice command platform, or elsewhere in the access channel.

As another example, although the foregoing describes a content request destined to a given content server, the invention could extend as well to apply in a scenario where the request ultimately seeks content from more than one content server. For instance, the request could be a request to a web portal that is set to obtain content from multiple content servers. In that case, the intermediation system could reside at the web portal server or between the portal server and the content servers, and the intermediation system could manage digital rights with respect to some or all of the resulting content requests generated on behalf of the requesting client by the web portal.

As still another example, although the foregoing mainly focuses on "payment" as a basis to have the right to access requested content, a user or client could gain access rights in other ways. For instance, a user or client could gain the right to access particular content through a purchase reward program, or through another sort of barter transaction, or for free.

Other example variations are possible as well.

What is claimed is:

1. In a communication system having a radio access network that interfaces between wireless client stations and a wireless carrier's core packet network, wherein the core packet network is in turn connected with a public packet network, and wherein content requests from the wireless client stations to content servers on the public packet network pass through the core packet network on their way, a method comprising:

operating an intermediation system on the core packet network, wherein the content requests pass through the intermediation system on their way from the wireless client stations to the content servers;

receiving into the intermediation system a given one of the content requests being transmitted from a given one of the client stations to a given one of the content servers, the content request defining a request for particular content and carrying a user-ID indicative of a user of the given client station;

confirming, at the intermediation system, that the user has a right to access the requested content, and responsively inserting into the content request, at the intermediation system, an access-token indicative of the right; and sending the content request, including the access-token, along from the intermediation system to the content server, whereby the content server may use the access-token as proof that the user has the right to access the requested content, wherein the method further comprises generating the access-token at the intermediation system, wherein generating the access-token comprises encrypting one or more values, and wherein the one or more values includes a timestamp.

2. The method of claim 1, wherein the one or more values comprise a combination of a content identifier, indicative of the requested content, a carrier identifier, indicative of the wireless carrier, and a customer identifier, indicative of the requesting user.

3. The method of claim 1, wherein the intermediation system comprises a gateway, and wherein:

receiving the content request comprises the gateway receiving the content request;

confirming that the user has the right to access the requested content comprises the gateway confirming that the user has the right to access the requested content; and sending the content request to the content server comprises the gateway sending the content request to the content server.

4. The method of claim 1, wherein the intermediation system comprises a gateway and a digital rights manager system, wherein the gateway receives the content request and passes the content request along to the digital rights manager system, and wherein:

receiving the content request comprises the digital rights manager system receiving the content request;

confirming that the user has the right to access the requested content comprises the digital rights manager system confirming that the user has the right to access the requested content; and sending the content request to the content server comprises the digital rights manager system sending the content request to the content server.

5. In a communication system having a radio access network that interfaces between wireless client stations and a wireless carrier's core packet network, wherein the core packet network is in turn connected with a public packet network, and wherein content requests from the wireless client stations to content servers on the public packet network pass through the core packet network on their way, a method comprising:

operating an intermediation system on the core packet network, wherein the content requests pass through the intermediation system on their way from the wireless client stations to the content servers;

receiving into the intermediation system a given one of the content requests being transmitted from a given one of the client stations to a given one of the content servers, the content request defining a request for particular content and carrying a user-ID indicative of a user of the given client station;

confirming at the intermediation system, that the user has a right to access the requested content and responsively inserting into the content request, at the intermediation system, an access-token indicative of the right; and sending the content request, including the access-token, along from the intermediation system to the content server, whereby the content server may use the access-token as proof that the user has the right to access the requested content, wherein the method further comprises determining, at the intermediation system, that the requested content is premium content for which access is limited, and responsively carrying out the confirming and inserting functions.

6. The method of claim 5, further comprising:

maintaining access control data indicating which content is premium content, wherein determining that the requested content is premium content comprises referring to the access control data.

7. The method of claim 5, wherein the intermediation system comprises a gateway and a digital rights manager system, wherein the gateway receives the content request and passes the content request along to the digital rights manager system, and wherein:

receiving the content request comprises the digital rights manager system receiving the content request;

confirming that the user has the right to access the requested content comprises the digital rights manager system confirming that the user has the right to access the requested content; and sending the content request to the content server comprises the digital rights manager system sending the content request to the content server.

8. In a communication system having a radio access network that interfaces between wireless client stations and a wireless carrier's core packet network, wherein the core packet network is in turn connected with a public packet network, and wherein content requests from the wireless client stations to content servers on the public packet network pass through the core packet network on their way, a method comprising:

operating an intermediation system on the core packet network, wherein the content requests pass through the intermediation system on their way from the wireless client stations to the content servers;

receiving into the intermediation system a given one of the content requests being transmitted from a given one of the client stations to a given one of the content servers, the content request defining a request for particular content and carrying a user-ID indicative of a user of the given client station;

confirming, at the intermediation system, that the user has a right to access the requested content, and responsively inserting into the content request, at the intermediation system, an access-token indicative of the right; and sending the content request including the access-token, along from the intermediation system to the content server, whereby the content server may use the access-token as proof that the user has the right to access the requested content, wherein the method further comprises maintaining digital rights management (DRM) data at the intermediation system, wherein confirming that the user has the right to access the requested content comprises referring to the DRM data to determine if the user has the right to access the requested content.

9. The method of claim 8, further comprising:

the intermediation system engaging in a payment collection with the user to collect payment for the requested content, if the DRM data does not indicate that the user has the right to access the requested content.

10. In a communication system having a radio access network that interfaces between wireless client stations and a wireless carrier's core packet network, wherein the core packet network is in turn connected with a public packet network, and wherein content requests from the wireless client stations and content servers on the public packet network pass through the core packet network on their way, the improvement comprising:

an intermediation system on the core packet network, wherein the content requests pass through the intermediation system on their way from the wireless client stations to the content servers;

wherein the intermediation system receives a given one of the content requests being transmitted from a given one of the client stations to a given one of the content servers, the content request defining a request for particular content and carrying a user-ID indicative of a user of the given client station;

wherein the intermediation system confirms that the user has a right to access the requested content, and the intermediation system responsively inserts into the content request an access-token indicative of the right, and wherein the intermediation system sends the content request, including the access-token, along to the content server;

wherein the intermediation system dynamically generates the access-token at least in part by encrypting one or more values, whereby the content server may use the access-token as proof that the user has the right to access the requested content.

11. The improvement of claim 10, wherein the one or more values comprise a combination of a content identifier, indicative of the requested content, a carrier identifier, indicative of the wireless carrier, and a customer identifier, indicative of the requesting user.

12. The improvement of claim 10, wherein the one or more values includes a timestamp.

13. The improvement of claim 10, wherein the intermediation system comprises a gateway that receives the content request, confirms that the user has the right to access the requested content, and sends the content request to the content server comprises the gateway sending the content request to the content server.

14. The improvement of claim 10, wherein the intermediation system comprises a gateway and a digital rights manager system, wherein the gateway receives the content request and passes the content request along to the digital rights manager system, and wherein the digital rights management system confirms that the user has the right to access the requested content, and sends the content request to the content server.

15. In a communication system having a radio access network that interfaces between wireless client stations and a wireless carrier's core packet network, wherein the core packet network is in turn connected with a public packet network, and wherein content requests from the wireless client stations and content servers on the public packet network pass through the core packet network on their way, the improvement comprising:

an intermediation system on the core packet network, wherein the content requests pass through the intermediation system on their way from the wireless client stations to the content servers;

wherein the intermediation system receives a given one of the content requests being transmitted from a given one of the client stations to a given one of the content servers, the content request defining a request for particular content and carrying a user-ID indicative of a user of the given client station;

wherein the intermediation system confirms that the user has a right to access the requested content, and the intermediation system responsively inserts into the content request an access-token indicative of the right, and wherein the intermediation system sends the content request, including the access-token, along to the content server, wherein the intermediation determines that the requested content is premium content for which access is limited, and the intermediation system responsively checks to determine if the user has the right to access the content, whereby the content server may use the access-token as proof that the user has the right to access the requested content.

16. The improvement of claim 15, wherein the intermediation system comprises access control data indicating which content is premium content, and wherein the intermediation system refers to the access control data in order to determine that the requested content is premium content.

17. The improvement of claim 15, wherein the intermediation system comprises a gateway and a digital rights manager system, wherein the gateway receives the content request and passes the content request along to the digital rights manager system, and wherein the digital rights management system confirms that the user has the right to access the requested content, and sends the content request to the content server.

18. In a communication system having a radio access network that interfaces between wireless client stations and a wireless carrier's core packet network, wherein the core packet network is in turn connected with a public packet network, and wherein content requests from the wireless client stations and content servers on the public packet network pass through the core packet network on their way, the improvement comprising:

an intermediation system on the core packet network, wherein the content requests pass through the intermediation system on their way from the wireless client stations to the content servers;

wherein the intermediation system receives a given one of the content requests being transmitted from a given one of the client stations to a given one of the content servers, the content request defining a request for particular content and carrying a user-ID indicative of a user of the given client station;

wherein the intermediation system confirms that the user has a right to access the requested content, and the intermediation system responsively inserts into the content request an access-token indicative of the right, and wherein the intermediation system sends the content request, including the access-token, along to the content server;

wherein the intermediation system comprises digital rights management (DRM) data, and wherein the intermediation system refers to the DRM data to determine if the user has the right to access the requested content, whereby the content server may use the access-token as proof that the user has the right to access the requested content.

19. The improvement of claim 18, wherein the intermediation system further engages in a payment collection with the user to collect payment for the requested content, if the DRM data does not indicate that the user has the right to access the requested content.

20. The improvement of claim 18, wherein the intermediation system comprises a gateway and a digital rights manager system, wherein the gateway receives the content request and passes the content request along to the digital rights manager system, and wherein the digital rights management system confirms that the user has the right to access the requested content, and sends the content request to the content server.

* * * * *